(12) United States Patent
Huang et al.

(10) Patent No.: US 11,415,975 B2
(45) Date of Patent: Aug. 16, 2022

(54) DEEP CAUSALITY LEARNING FOR EVENT DIAGNOSIS ON INDUSTRIAL TIME-SERIES DATA

(71) Applicant: GENERAL ELECTRIC COMPANY, Schenectady, NY (US)

(72) Inventors: Hao Huang, San Ramon, CA (US);
Feng Xue, Clifton Park, NY (US);
Weizhong Yan, Clifton Park, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 254 days.

(21) Appl. No.: 16/564,283

(22) Filed: Sep. 9, 2019

(65) Prior Publication Data
US 2021/0072740 A1    Mar. 11, 2021

(51) Int. Cl.
*G05B 23/00*    (2006.01)
*G05B 23/02*    (2006.01)
(Continued)

(52) U.S. Cl.
CPC ....... *G05B 23/0248* (2013.01); *G05B 19/406* (2013.01); *G05B 23/0254* (2013.01);
(Continued)

(58) Field of Classification Search
CPC ............ G05B 23/0248; G05B 23/0254; G05B 19/406; G05B 23/024; G06F 17/16;
(Continued)

(56) References Cited

U.S. PATENT DOCUMENTS

| 10,031,510 B2 | 7/2018 | Zhao et al. |
| 2009/0234467 A1* | 9/2009 | Sabe .................. G05B 13/0265 700/29 |

(Continued)

FOREIGN PATENT DOCUMENTS

CN         109407654 A       3/2019

OTHER PUBLICATIONS

Cirstea, Razvan-Gabriel et al. "Correlated time series forecasting using multi-task deep neural networks." (ACM, 2018) CIKM '18: Proceedings of the 27th ACM International Conference on Information and Knowledge Management. pp. 1527-1530. https://doi.org/10.1145/3269206.3269310 (Year: 2018).*

(Continued)

*Primary Examiner* — Rehana Perveen
*Assistant Examiner* — Daniel E Miller
(74) *Attorney, Agent, or Firm* — Buckley, Maschoff & Talwalkar LLC

(57) ABSTRACT

According to embodiments, a system, method and non-transitory computer-readable medium are provided to receive time series data associated with one or more sensors values of a piece of machinery at a first time period, perform a non-linear transformation on the time-series data to produce one or more nonlinear temporal embedding outputs, and projecting each of the nonlinear temporal embedding outputs to a different dimension space to identify at least one causal relationship in the nonlinear temporal embedding outputs. The nonlinear embeddings are further projected to the original dimension space to produce one or more causality learning outputs. Nonlinear dimensional reduction is performed on the one or more causality learning outputs to produce reduced dimension causality learning outputs. The learning outputs are mapped to one or more predicted (Continued)

outputs which include a prediction of one or more of the sensor values at a second time period.

11 Claims, 4 Drawing Sheets

(51) Int. Cl.
*G06F 17/16* (2006.01)
*G06N 3/08* (2006.01)
*G06N 3/04* (2006.01)
*G05B 19/406* (2006.01)

(52) U.S. Cl.
CPC .............. *G06F 17/16* (2013.01); *G06N 3/049* (2013.01); *G06N 3/08* (2013.01)

(58) Field of Classification Search
CPC .......... G06F 17/18; G06N 3/08; G06N 3/049; G06N 3/00
See application file for complete search history.

(56) References Cited

U.S. PATENT DOCUMENTS

| | | | |
|---|---|---|---|
| 2017/0284896 A1 | 10/2017 | Harpale et al. | |
| 2018/0260697 A1 | 9/2018 | Sun et al. | |
| 2018/0348747 A1 | 12/2018 | Lavid Ben Lulu et al. | |
| 2019/0018375 A1 | 1/2019 | Deshpande et al. | |
| 2019/0102680 A1* | 4/2019 | Liu | G06N 5/02 |
| 2019/0139441 A1* | 5/2019 | Akella | G06F 16/2228 |
| 2019/0228110 A1* | 7/2019 | Yan | G06N 3/0472 |
| 2020/0249651 A1* | 8/2020 | Lee | G05B 23/0221 |
| 2020/0364504 A1* | 11/2020 | Xu | G06K 9/6273 |
| 2021/0012191 A1* | 1/2021 | Qiao | G06K 9/00536 |
| 2021/0035001 A1* | 2/2021 | Ikeda | G06N 7/005 |

OTHER PUBLICATIONS

Narendra, Tanmayee, Anush Sankaran, Deepak Vijaykeerthy, and Senthil Mani. "Explaining deep learning models using causal inference." (arxiv.org, 2018) arXiv preprint arXiv:1811.04376. pp. 1-7 [online] https://arxiv.org/abs/1811.04376 (Year: 2018).*
Majidpour, Mostafa, Charlie Qiu, Peter Chu, Rajit Gadh, and Hemanshu R. Pota. "Fast prediction for sparse time series: Demand forecast of EV charging stations for cell phone applications." IEEE Transactions on Industrial Informatics 11, No. 1 (2014): 242-250. (Year: 2014).*
Cirstea, Razvan-Gabriel et al. "Correlated time series forecasting using multi-task deep neural networks." (ACM, 2018) CIKM '18: Proceedings of the 27th ACM International Conference on Information and Knowledge Management, pp. 1527-1530. https://doi.org/10.1145/3269206.3269310 (Year: 2018) (Year: 2018).*
Narendra, Tanmayee, Anush Sankaran, Deepak Vijaykeerthy, and Senthil Mani. "Explaining deep learning models using causal inference." (arxiv.org, 2018) arXiv preprint arXiv:1811.04376. pp. 1-7 [online] https://arxiv.org/abs/1811.04376 (Year: 2018) (Year: 2018).*
Majidpour, Mostafa, Charlie Qiu, Peter Chu, Rajit Gadh, and Hemanshu R. Pota. "Fast prediction for sparse time series: Demand forecast of EV charging stations for cell phone applications." IEEE Transactions on Industrial Informatics 11, No. 1 (2014): 242-250. (Year: 2014) (Year: 2014).*
H. Qiu, Y. Liu, N. A. Subrahmanya and W. Li, "Granger Causality for Time-Series Anomaly Detection," 2012 IEEE 12th International Conference on Data Mining, 2012, pp. 1074-1079, doi: 10.1109/ICDM.2012.73. (Year: 2012).*
Xia, Min, Teng Li, Lin Xu, Lizhi Liu, and Clarence W. De Silva. "Fault diagnosis for rotating machinery using multiple sensors and convolutional neural networks." (IEEE, 2017) IEEE/ASME transactions on mechatronics 23, No. 1 pp. 101-110. DOI 10.1109/TMECH.2017.2728371. (Year: 2017).*
Sun, Chuang, et al. "Deep Residual Network With Hybrid Dilated Convolution for Gearbox Fault Diagnosis." (ISFA, 2018) In Proceedings of the International Symposium on Flexible Automation 2018 International Symposium on Flexible Automation, pp. 318-324. Online ISSN : 2434-446X (Year: 2018).*
Zoumpourlis, Georgios, Alexandros Doumanoglou, Nicholas Vretos, and Petros Daras. "Non-linear convolution filters for cnn-based learning." (IEEE, 2017) In Proceedings of the IEEE international conference on computer vision, pp. 4761-4769. (Year: 2017).*
Zhao, Minghang, Myeongsu Kang, Baoping Tang, and Michael Pecht. "Deep residual networks with dynamically weighted wavelet coefficients for fault diagnosis of planetary gearboxes." (IEEE, 2017) IEEE Transactions on Industrial Electronics 65, No. 5: 4290-4300. (Year: 2017).*
Zhang et. al.: "Deep Causality Learning for Event Diagnosis on Industrial Time Series Data", Multivariate Time Series Data. arXiv preprint, arXiv:1811.08055, Nov. 2018, pp. 1-9.
Alizadeh et. al.: "A Data-Driven Causality Analysis Tool for Fault Diagnosis in Industrial Processes", IFAC—PapersOnLine, 2018, vol. 51, Issue: 24, pp. 147-152.

* cited by examiner

DEEP CAUSALITY LEARNING FOR EVENT DIAGNOSIS ON INDUSTRIAL TIME-SERIES DATA

BACKGROUND

Industrial machinery, such as turbines, are subject to failure for a variety of causes such as failure of an individual component of the machinery. Machinery failures are typically detected by sensors. Once a failure is detected by sensors, the failure is reported to an operator for correction. Recent advancement in industrial machinery design has led to the increasing need of developing data-driven analytic in various aspects including design, control, and operation optimization. Among these applications, machinery failure analysis is a long-standing crucial problem that can significantly benefit from data mining.

Causal analysis becomes more relevant in industrial settings, where the aim is not only to predict the failure but also to identify the reasons for such failure. The objective is to identify erroneous and poor performing components and estimate the causal impact of such components on overall failure. Examples include the causal estimation for mechanical or hydraulic installation errors or wrong parameterization of a control system or sub-optimal end-user settings. Such analysis may in turn lead to identification of possible root causes.

Traditional causal learning methods are either based on linear systems, such as Vector Autoregressive (VAR) Granger analysis or Generalized Additive Models, or pre-assumed regression models. However, many interactions in model industrial systems are non-linear and in high-dimensions with unknown distribution. Selecting appropriate model for each time series requires a deep understanding of the domain knowledge and in many cases not even possible. Furthermore, given a limited amount of fault cases and ubiquitous noise on time series data, it is challenging to learn a stable model which correctly identifies causality behind events.

It would be desirable to provide for an unsupervised framework to determine nonlinear causality on both temporal and inter-sensor relationships without requiring a pre-defined kernel or distribution assumption.

SUMMARY

According to some embodiments, a computer-implemented method includes receiving time series data associated with one or more sensors values of a piece of machinery at a first time period, and performing a non-linear transformation on the time-series data to uncover nonlinearity of the time-series data to produce one or more nonlinear temporal embedding outputs. The embodiment further includes projecting each of the non-linear temporal embedding outputs from a first dimension space into a second dimension space and identifying at least one causal relationship in the one or more nonlinear temporal embedding outputs. The embodiment further includes projecting the nonlinear temporal embeddings in the second dimension space to the first dimension space to produce one or more causality learning outputs. The embodiment further includes performing non-linear dimensional reduction on the one or more causality learning outputs to produce reduced dimension causality learning outputs of a third dimension space. The embodiment further includes mapping the reduced dimension causality learning outputs to one or more predicted outputs, the one or more predicted outputs including a prediction of one or more of the sensor values at a second time period.

According to some embodiments, a system for event diagnosis of machinery includes a processor and a non-transitory computer readable medium comprising instructions that, when executed by the processor, perform a method. In an embodiment, the method includes receiving time series data associated with one or more sensors values of a piece of machinery at a first time period. In the embodiment, the method further includes performing a non-linear transformation on the time-series data to uncover nonlinearity of the time-series data to produce one or more nonlinear temporal embedding outputs. In the embodiment, the method further includes projecting each of the nonlinear temporal embedding outputs from a first dimension space into a second dimension space and identifying at least one causal relationship in the one or more nonlinear temporal embedding outputs. In the embodiment, the method further includes projecting the nonlinear temporal embeddings in the second dimension space to the first dimension space to produce one or more causality learning outputs. In the embodiment, the method further includes performing nonlinear dimensional reduction on the one or more causality learning outputs to produce reduced dimension causality learning outputs of a third dimension space. In the embodiment, the method further includes mapping the reduced dimension causality learning outputs to one or more predicted outputs, the one or more predicted outputs including a prediction of one or more of the sensor values at a second time period.

According to some embodiments, a non-transitory computer-readable medium comprising instructions that, when executed by the processor, perform a method. In an embodiment, the method includes receiving time series data associated with one or more sensors values of a piece of machinery at a first time period. In the embodiment, the method further includes performing a non-linear transformation on the time-series data to uncover nonlinearity of the time-series data to produce one or more nonlinear temporal embedding outputs. In the embodiment, the method further includes projecting each of the non-linear temporal embedding outputs from a first dimension space into a second dimension space and identifying at least one causal relationship in the one or more nonlinear temporal embedding outputs. In the embodiment, the method further includes projecting the nonlinear temporal embeddings in the second dimension space to the first dimension space to produce one or more causality learning outputs. In the embodiment, the method further includes performing nonlinear dimensional reduction on the one or more causality learning outputs to produce reduced dimension causality learning outputs of a third dimension space. In the embodiment, the method further includes mapping the reduced dimension causality learning outputs to one or more predicted outputs, the one or more predicted outputs including a prediction of one or more of the sensor values at a second time period.

DETAILED DESCRIPTION

Figure 1:
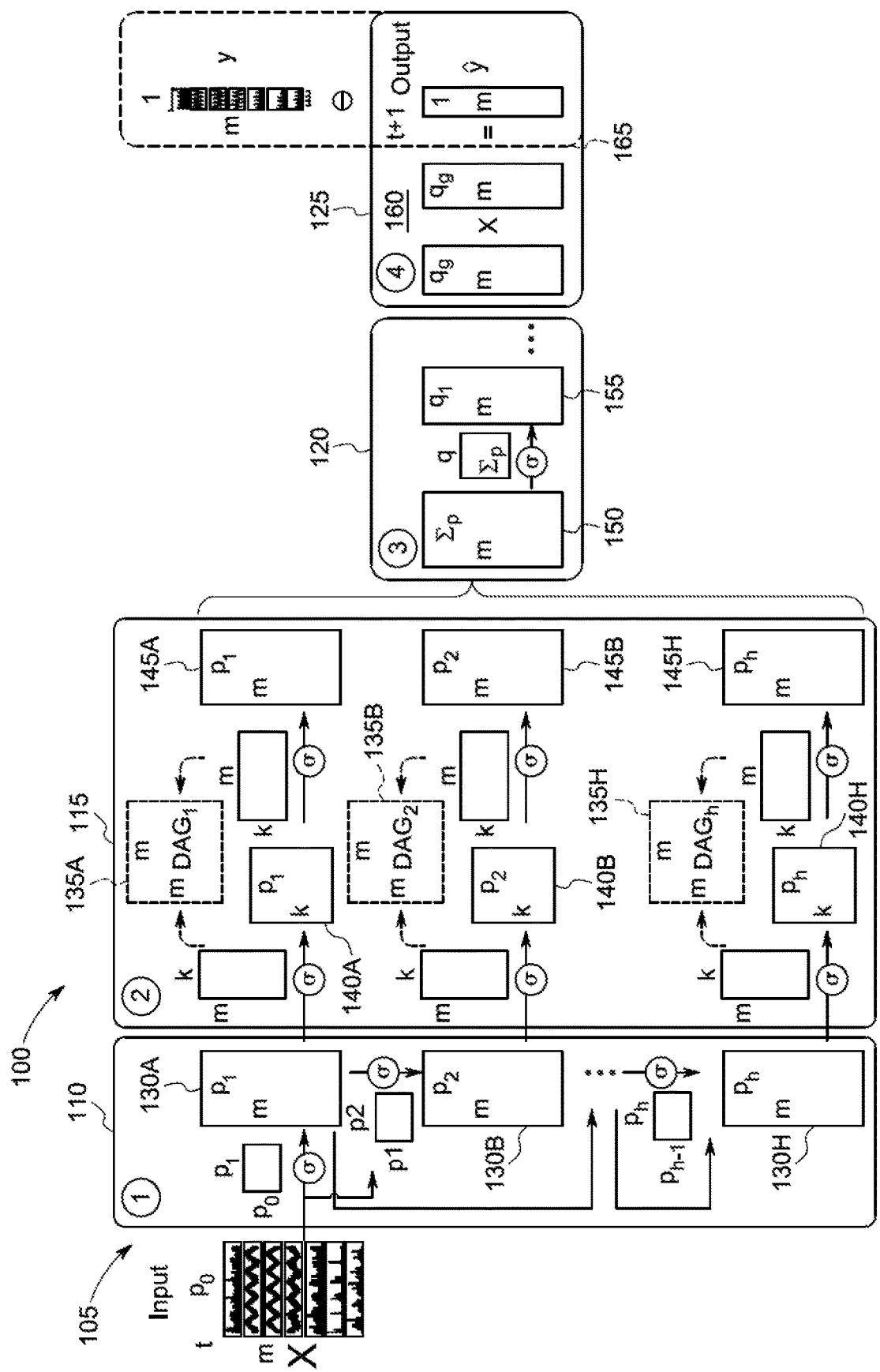
FIG. 1 is a high-level architecture of a deep causality learning platform for event diagnosis on industrial time-series data according to some embodiments.

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Deep learning techniques have been more and more popular in industrial application, but there has been little research regarding how deep learning can contribute to learning causality on industrial data, especially time series sensor reading data. One or more embodiments provide for an unsupervised framework for nonlinear deep causal learning for industrial time series sensor data. One or more embodiments provide for exploring non-linear causality on both temporal and inter-sensor relationships. One or more embodiments utilize low-rank learning to reduce noise influence and achieve improved accuracy. One or more embodiments are capable of providing a model to detect an event cause by tracking any update attempt in real time.

A deep neural network is a neural network with multiple layers between input and output layers and typically include feedforward networks in which input data flows from the input layer to the output layer without looping back. Recently, the use of deep neural networks for unsupervised anomaly detection and diagnosis has been proposed. However, the proposed networks require learning on normal data, uses predefined kernels to represent normal relationships, and has a linear assumption. However, the proposed networks are not capable of revealing complex interactions in real world industrial data.

Since real-world failure cases are limited and different kinds of failure modes may exist, one or more embodiments described herein provide for an end-to-end trainable deep causality learning model that is unsupervised (i.e., trained on normal data only) and robust against noise. One or more embodiments provide for a time series data event diagnosis framework structure that is based on a nested deep neural network model in which the input data is assumed to be normal time series collected under different operation conditions/modes. In particular embodiments, the model includes four parts: (1) temporal non-linearity unrolling; (2) causality learning; (3) dimensional reduction; and (4) output prediction to project the embeddings formed by the previous part to an output space. Once the model is sufficiently trained and stable, the model captures the normal causality behavior of the system. During run-time application, any attempted model update trigger alerts and the corresponding causality change is captured. The causality change is treated as a failure causality.

FIG. 1 is a high-level architecture of a deep causality learning platform 100 for event diagnosis on industrial time-series data according to some embodiments. The deep causality learning platform 100 includes a model having a temporal non-linearity unrolling stage 110, a causality learning stage 115, a dimensional reduction stage 120, and an output prediction stage 125. In one or more embodiments, temporal non-linearity unrolling stage 110 receives a time-series data input 105 including data readings from m sensors of the latest $p_0$ to $p_h$ temporal samples at a timestamp t associated with a first time period. Temporal non-linearity unrolling stage 110 includes a residual neural network (ResNet) to perform a series of nonlinear transformations on the time-series data input 105 to uncover nonlinearity in the temporal measurements of the time-series data input 105. A residual neural network (ResNet) utilizes skip connections to jump over some layers of the neural network. A Resnet typically includes double-layer or triple-layer skips that contain nonlinearities and batch normalization between layers.

Figure 2:
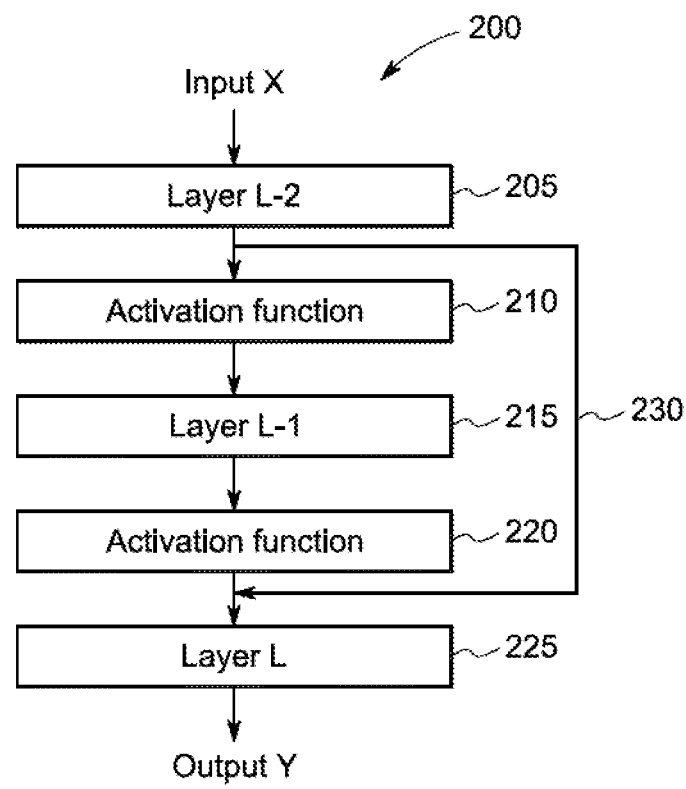
FIG. 2 is a simplified block diagram of an example residual neural network (ResNet).

FIG. 2 is a simplified block diagram of an example residual neural network (ResNet) 200. The example ResNet 200 includes a first layer (L-2) 205, a first activation function 210, a second layer (L-1) 215, a second activation function 220, and a third layer (L) 225. The first layer (L-2) is configured to receive an input X of, for example, time-series industrial data. The first activation function 210 is coupled between an output of first layer (L-2) 205 and an input of second layer (L-1) 215, and the second activation function 220 is coupled between an output of the second layer (L-1) and an input of the third layer (L) 225. In the example of FIG. 2, the second layer (L-1) is skipped over 230 from the output of the first layer (L-2) 205 to the third layer (L) 225. Skipping of layers assists in avoiding a problem of vanishing gradients by reusing activations from a previous layer until the adjacent layer learns its weight. The vanishing gradient problem may arise when the gradient becomes too small, effectively preventing the weights from changing their value, and inhibiting further training of the network. Skipping of layers may further simplify the network by using fewer layers in the initial training stages and increase learning speed.

In general, an activation function defines an output of a neural network node given a set of inputs. In the case of the ResNet 200 of FIG. 2, the activation functions 210, 220 add non-linearity and returns transformed outputs in response to receiving one or more inputs from the previous layer. Examples of activation functions that may be used in the ResNet 200 of FIG. 2 include, but are not limited to, a sigmoid function or a rectifier linear unit (ReLU).

Referring again to FIG. 1, the temporal non-linearity unrolling stage 110 includes a ResNet implemented to uncover nonlinearities in the temporal measurements contained within the time-series data input 105 including the data readings from the m sensors of the latest $p_0$ to $p_h$ temporal samples at the timestamp t. In the particular embodiment, the non-linearity unrolling stage 110 includes a plurality h of ResNet layers 130A-130h. The temporal samples $p_0$ and $p_1$ from the m sensors are input to an activation function, and the output is provided to layer 130A. The temporal samples $p_1$ and $p_2$ from the m sensors are input to an activation function coupled between layer 130A layer 130B, and the output is provided to layer 130B. Layers 130C-130h-1 (not shown) are configured in a similar manner and are each configured to receive two of consecutive samples $p_2$-$p_{h-1}$ from corresponding activation functions and provide the output to the next layer. The temporal samples $p_{h-1}$ and $p_h$ from the m sensors are input to an activation function coupled between the layer 130h-1 and the last layer 130h of temporal non-linearity unrolling stage 110. The layers 130A-130h perform a non-linear transformation on the time-series data input 105 to uncover the nonlinearity of the temporal measurements of the time-series data input 105 and produce nonlinear temporal embedding outputs.

The causality learning stage 115 includes a neural network model to project each of the nonlinear temporal embedding outputs of the non-linearity unrolling stage 110 from the original m dimension space into lower dimensions k to explore the low-rank sensors interaction by cause side projections 140A-140h, and identify causal relationships in the nonlinear temporal embedding outputs. The causality learning stage 115 includes a nested neural network structure that can skip connections between layers and therefore avoid the problems of overfitting and vanishing gradient. In the particular embodiment illustrated in FIG. 1, the causality learning stage 115 includes a plurality of directed acyclic graph (DAG) components 135A-135h corresponding to each of nonlinear temporal embedding outputs of the non-linearity unrolling stage 110. A DAG is a directed graph that contains no cycles connecting the outer edges such that is it impossible to start at one edge in the graph and traverse the entire graph. In the context of a neural network, a DAG neural network is a network for deep learning with layers arranged as a directed acyclic graph.

Figure 3:
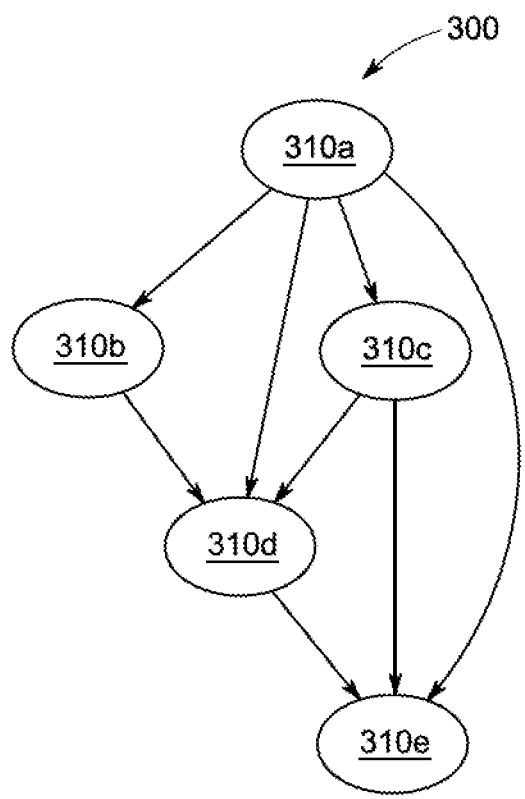
FIG. 3 is a simplified block diagram of an example directed acyclic graph (DAG) 300 for a neural network.

FIG. 3 is a simplified block diagram of an example directed acyclic graph (DAG) 300 for a neural network. The DAG 300 includes a plurality of neural network layers 310A, 310B, 310C, 310D, and 310E connected by arrows that only flow in one direction. In particular, layer 310A is connected to each of node 310B, 310C, 310D, and 310E by different arrows. Layer 310B is connected to layer 310D by a unidirectional arrow, and layer 310D is connected to layer 310E by a unidirectional arrow. Layer 310C is connected to layer 310D and layer 310E by separate unidirectional arrows. Layer 310D is connected to node 310E by a single unidirectional arrow. As shown in FIG. 3, the layers 310A-310E of DAG 300 are connected such that it is not possible to start at one of the layers and traversed every layer of DAG 300. For example, starting at the layer 310A it is possible to traverse the layers 310A, 310D, and 310E. However, it is not possible to traverse the layer 310C when starting at the layer 310A and traversing to the layer 310B.

Referring again to FIG. 1, causality learning stage 115 is further configured to project the low-rank nonlinear embeddings in dimension space k back to the original dimension space m through effect side projections 145A-145h to produce causality learning outputs. The dimensional reduction stage 120 concatenates 150 the last embeddings from the causality learning stage 120 into a whole concatenated matrix. The dimensional reduction stage 120 further performs a nonlinear dimensional reduction 155 on the concatenated matrix to produce a dimension reduced matrix q.

The output prediction stage 125 learns a final layer of a weight matrix through a row-wise dot product 160 to map the dimension reduced matrix to an output 165 including a prediction of m sensor values at a time stamp t+1. Accordingly, the model implemented by deep causality learning platform 100 predicts all of the sensor readings at the next timestamp t+1. In one or more embodiments, a residual is calculated by mean square error (MSE), and the error is back propagated in the model to update parameters on each layer.

Once the model is stably trained with an acceptable validation error, normal causality graphs in the format of DAG can be represented by the low rank weight matrix composition combining the cause and effect side projection from the causality learning stage 115. In particular embodiments, a weighted combination of the DAGs from each path in the causality learning stage 115 are performed.

During run-time application of the trained model, all of the weights of the layers may be fixed. When the prediction error is sufficiently small, the observed data is considered as normal. Otherwise, a new and modifiable copy of the model may be initialized to track the back propagation by this loss to determine which weights in the low rank embedding layers the new observed anomaly is trying to update. The change can be described structurally as a DAG. This structured change can be used to determine which sensor might cause this anomaly, which sensors are affected, and the manner in which the sensors are affected.

In some embodiments in which no fault event data is available, the model may be validated through a synthetic dataset. In particular embodiments, normal data is generated by predefining a data generator with fixed formula relationships among sensors. After training on such data, a first verification step may be used to determine if the discovered causality is consistent with the formula relationship in the data generator. Noise and abnormal relationship patterns may be injected to generate new data for testing, and the new model may be analyzed to determine if the model can successfully capture these anomalies and detect the unusual patterns on the sensor relationship. In some embodiments, the model may be validated through real world event data. By testing on such data, a determination may be made regarding whether the model can successfully detect large prediction error on a problematic input, and trace the change back to the causality level. In particular embodiments, the detected structure change can be delivered to domain experts to determine if the change makes physical sense.

As used herein, devices, including those associated with the deep causality learning platform 100 and any other device described herein, may exchange information via any communication network which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

The deep causality learning platform 100 may receive input data from a plurality of sensors, from a database, or from another system such as an onboard data collection system. The database (not shown in FIG. 1), may be used by the deep causality learning platform 100 to store information into and/or retrieve information associated with a piece of machinery being evaluated in real-time or on a periodic basis (e.g., daily, weekly, monthly). The database may be locally stored or reside remote from the deep causality learning platform 100. Although a single deep causality learning platform 100 is shown in FIG. 1, any number of such devices may be included. Moreover, various devices described herein might be combined according to embodiments of the present invention. For example, in some embodiments, the deep causality learning platform 100 and database might comprise a single apparatus. In some embodiments, the input data may be received in real-time from the plurality of sensors or another system.

Once anomalies are detected, the detected anomalies may be evaluated to determine if a level or amount of anomalies reaches a threshold that triggers an alert to an operator. By alerting an operator to anomalies prior to an actual failure, repair costs of the machinery may be reduced, and the safety of the machinery may be increased. For example, in a case that a bearing, or an unknown fault, in an aircraft engine is showing signs of degradation, the bearing may be replaced prior to actual engine damage or a risk to passengers. Similarly, the unknown fault may be addressed prior to actual engine damage and passenger risk.

In one or more embodiments, an alert is generated on an operator dashboard provided by the deep causality learning platform 100 to display a notification to an operator to notify the operator of a predicted fault in one or more components/parts of a piece of machinery. In a particular embodiment, the dashboard may provide further information to the operator regarding the predicted fault to allow the operator to further analyze the anomalies indicative of the predicated fault. In other embodiments, an alert is generated by the deep causality learning platform 100 to a maintenance system to effect an overhaul or replacement of a part/component of the machinery in response to a predicted fault.

Figure 4:
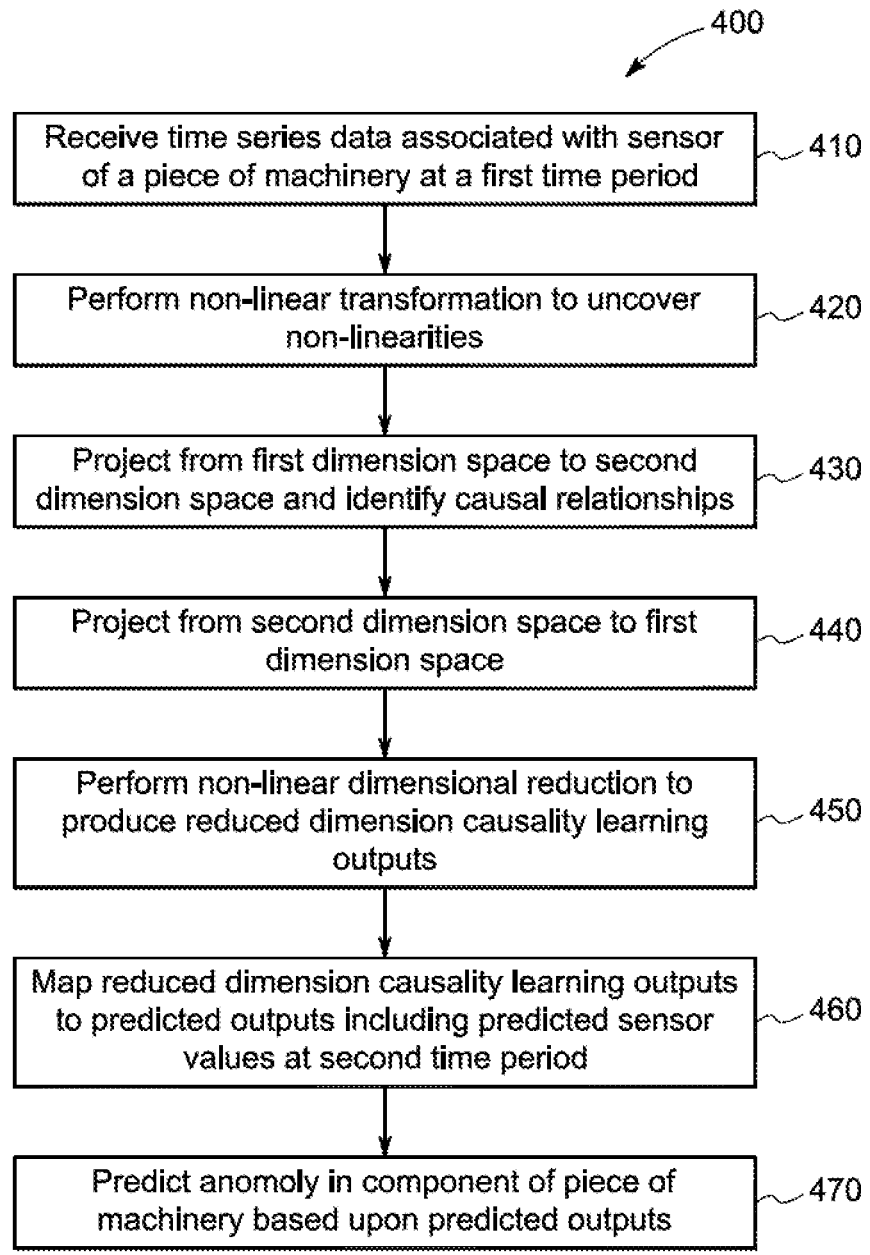
FIG. 4 illustrates a process that might be performed by some of all of the elements of the deep causality learning platform described with respect to FIG. 1 in accordance with some embodiments.

FIG. 4 illustrates a process 400 that might be performed by some of all of the elements of the deep causality learning platform 100 described with respect to FIG. 1 in accordance with some embodiments. Process 400, and any other process described herein may be performed using any suitable combination of hardware (e.g., circuit(s)), software or manual means. For example, a computer-readable storage medium may store thereon instructions that when executed by a machine result in performance according to any of the embodiments described herein. In one or more embodiments, the deep causality learning platform 100 is conditioned to perform the process 400 such that the system is a special-purpose element configured to perform operations not performable by a general-purpose computer or device. Software embodying these processes may be stored by any non-transitory tangible medium including a fixed disk, a floppy disk, a CD, a DVD, a Flash drive, or a magnetic tape. Examples of these processes will be described below with respect to embodiments of the system, but embodiments are not limited thereto. The flow charts described herein do not imply a fixed order to the steps, and embodiments of the present invention may be practiced in any order that is practicable.

Initially, at 410, the deep causality learning platform 100 receives time series data associated with one or more sensors values of a piece of machinery at a first time period. At 420, the deep causality learning platform 100 performs, using a neural network, a non-linear transformation on the time-series data to uncover nonlinearity of the time-series data to produce one or more nonlinear temporal embedding outputs. In one or more embodiments, the performing of the non-linear transformation on the time-series data is performed by a first stage of the neural network. In a particular embodiment, the first stage of the neural network includes a residual neural network.

At 430, the deep causality learning platform 100 projects each of the nonlinear temporal embedding outputs from a first dimension space into a second dimension space and identifies at least one causal relationship in the one or more nonlinear temporal embedding outputs. In one or more embodiments, the first dimension space is greater than the second dimension space. In one or more embodiments, the projecting each of the nonlinear temporal embedding outputs is performed by a second stage of the neural network. In particular embodiments, the second stage includes one or more directed acyclic graph (DAG) neural network components.

At 440, the deep causality learning platform 100 projects the non-linear temporal embeddings in the second dimension space to the first dimension space to produce one or more causality learning outputs. At 450, the deep causality learning platform 100 performs nonlinear dimensional reduction on the one or more causality learning outputs to produce reduced dimension causality learning outputs of a third dimension space. In one or more embodiments, the second dimension space is greater than the third dimension space.

In one or more embodiments, the deep causality learning platform 100 concatenates the one or more causality learning outputs into a single matrix prior to performing the nonlinear dimensional reduction on the one or more causality learning outputs.

At 460, the deep causality learning platform 100 maps the reduced dimension causality learning outputs to one or more predicted outputs. In one or more embodiments, the mapping of the reduced dimension causality learning outputs to the one or more predicted outputs includes performing a row-wise dot product upon the reduced dimension causality learning outputs. In the embodiment, the one or more predicted outputs includes a prediction of one or more of the sensor values at a second time period. At 470, the deep causality learning platform 100 predicts an anomaly in a component of the piece of machinery based upon the one or more predicted outputs.

Figure 5:
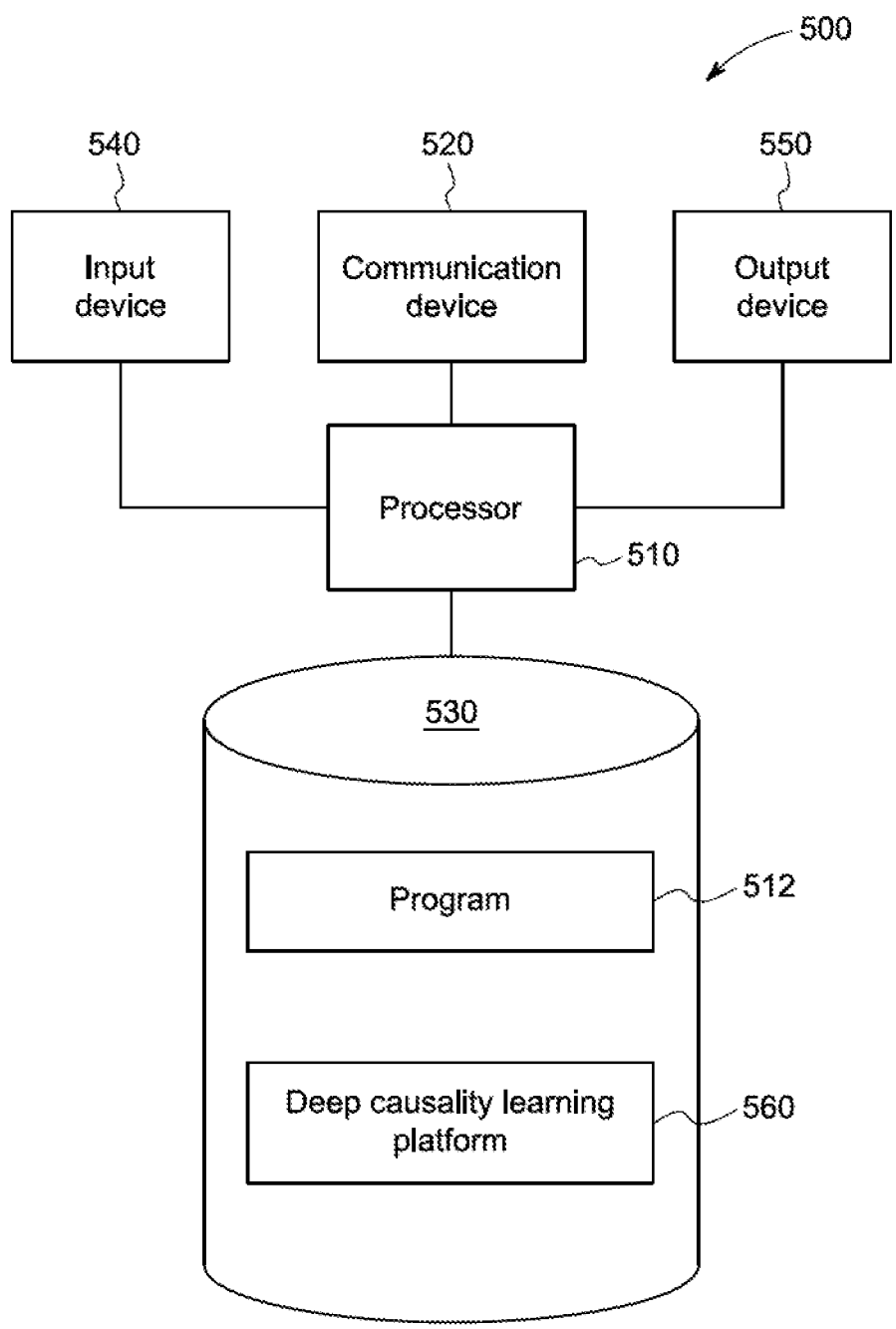
FIG. 5 is a block diagram of system according to some embodiments

The embodiments described herein may be implemented using any number of different hardware configurations. For example, FIG. 5 is a block diagram of a system 500, for example, associated with the deep causality learning platform 100 of FIG. 1, according to some embodiments. The system 500 comprises a processor 510, such as one or more commercially available Central Processing Units ("CPUs") in the form of one-chip microprocessors, coupled to a communication device 520 configured to communicate via a communication network (not shown in FIG. 5). The communication device 520 may be used to communicate, for example, with one or more remote data source nodes, user platforms, etc. The system 500 further includes an input device 540 (e.g., keyboard or mouse) and/an output device 550 (e.g., a computer monitor to render a display). According to some embodiments, a mobile device, monitoring physical system, and/or PC may be used to exchange information with the system 500.

The processor 510 also communicates with a storage device 530. The storage device 530 may comprise any appropriate information storage device, including combinations of magnetic storage devices (e.g., a hard disk drive), optical storage devices, mobile telephones, and/or semiconductor memory devices. The storage device 530 stores a program 512 for controlling the processor 510. The processor 510 performs instructions of the program 512 and thereby operates in accordance with any of the embodiments described herein. The storage device 530 further stores a deep causality learning platform 560 such as deep causality learning platform 100 of FIG. 1.

The program 512 may be stored in a compressed, uncompiled and/or encrypted format. The program 512 may furthermore include other program elements, such as an operating system, clipboard application, a database management system, and/or device drivers used by the processor 510 to interface with peripheral devices.

As used herein, information may be "received" by or "transmitted" to, for example: (i) the evaluation platform 500 from another device; or (ii) a software application or module within the evaluation platform 500 from another software application, module, or any other source.

Various embodiments of the deep causality neural network described herein provide a model that does not rely on any predefined kernel or distribution assumption. By training on normal datasets under different conditions, the deep causality neural network according to one or more embodiments can automatically uncover normal structural causality under different running modes. Therefore, any breaking relationship or abnormal interaction that may lead to system failure can be detected in time. One or more embodiments of the deep causality neural network may learn directed acyclic graphs (DAGs) which represent normal causality under different conditions and operation modes. The DAGs may be represented by low-rank decomposition, which provide model robustness against noisy perturbation in raw sensor measurements. In one or more embodiments, a causality change can be quantified by the degree of graph change. One or more embodiments may perform weighted combination of temporal multigraphs to represent non-linear Granger causality for representing dynamic and complex interactions among sensors and/or components.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A method comprising:
   receiving time series data associated with one or more sensor values of a piece of machinery at a first time period;
   performing a non-linear transformation on the as-received time-series data to uncover nonlinearity of the time-series data to produce one or more nonlinear temporal embedding outputs;
   projecting each of the nonlinear temporal embedding outputs from a first dimension space into a second dimension space and identifying at least one causal relationship in the one or more non-linear temporal embedding outputs, wherein the at least one causal relationship includes a cause and an effect;
   projecting the nonlinear temporal embedding outputs in the second dimension space to the first dimension space to produce one or more causality learning outputs;
   performing nonlinear dimensional reduction on the one or more causality learning outputs to produce reduced dimension causality learning outputs of a third dimension space,
      wherein the performing of the non-linear transformation on the time-series data is performed by a first stage of a neural network that includes a residual neural network, and
      wherein the residual neural network has a plurality of layer outputs, and each layer output of the plurality is provided as the one or more nonlinear temporal embedding outputs;
   mapping the reduced dimension causality learning outputs to one or more predicted outputs, the one or more predicted outputs including a prediction of one or more of the sensor values at a second time period; and
   predicting an anomaly in a component of the piece of machinery based upon the one or more predicted outputs.

2. The method of claim 1, wherein the projecting each of the nonlinear temporal embedding outputs is performed by a second stage of a neural network.

3. The method of claim 2, wherein the second stage includes one or more directed acyclic graph (DAG) neural network components.

4. The method of claim 1, further comprising:
   concatenating the one or more causality learning outputs into a single matrix prior to performing the nonlinear dimensional reduction on the one or more causality learning outputs.

5. The method of claim 1, wherein the mapping of the reduced dimension causality learning outputs to the one or more predicted outputs includes performing a row-wise dot product upon the reduced dimension causality learning outputs.

6. The method of claim 1, wherein the first dimension space is greater than the second dimension space.

7. The method of claim 1, wherein the second dimension space is greater than the third dimension space.

8. A system for event diagnosis of machinery comprising:
   a processor;
   a non-transitory computer readable medium comprising instructions that, when executed by the processor, perform a method, the method comprising:
   receiving time series data associated with one or more sensors values of a piece of machinery at a first time period;
   performing a non-linear transformation on the as-received time-series data to uncover nonlinearity of the time-series data to produce one or more nonlinear temporal embedding outputs;
   projecting each of the nonlinear temporal embedding outputs from a first dimension space into a second dimension space and identifying at least one causal relationship in the one or more non-linear temporal embedding outputs, wherein the at least one causal relationship includes a cause and an effect;
   projecting the nonlinear temporal embeddings in the second dimension space to the first dimension space to produce one or more causality learning outputs;

performing nonlinear dimensional reduction on the one or more causality learning outputs to produce reduced dimension causality learning outputs of a third dimension space,
  wherein the performing of the non-linear transformation on the time-series data is performed by a first stage of a neural network that includes a residual neural network, and
  wherein the residual neural network has a plurality of layer outputs, and each layer output of the plurality is provided as the one or more nonlinear temporal embedding outputs;
mapping the reduced dimension causality learning outputs to one or more predicted outputs, the one or more predicted outputs including a prediction of one or more of the sensor values at a second time period; and
predicting an anomaly in a component of the piece of machinery based upon the one or more predicted outputs.

9. The system of claim 8, wherein the projecting each of the nonlinear temporal embedding outputs is performed by a second stage of a neural network.

10. The system of claim 9, wherein the second stage includes one or more directed acyclic graph (DAG) neural network components.

11. A non-transitory computer-readable medium comprising instructions that, when executed by the processor, perform a method, the method comprising:
  receiving time series data associated with one or more sensors values of a piece of machinery at a first time period;
  performing a non-linear transformation on the as-received time-series data to uncover nonlinearity of the time-series data to produce one or more nonlinear temporal embedding outputs;
  projecting each of the nonlinear temporal embedding outputs from a first dimension space into a second dimension space and identifying at least one causal relationship in the one or more non-linear temporal embedding outputs, wherein the at least one causal relationship includes a cause and an effect;
  projecting the nonlinear temporal embeddings in the second dimension space to the first dimension space to produce one or more causality learning outputs;
  performing nonlinear dimensional reduction on the one or more causality learning outputs to produce reduced dimension causality learning outputs of a third dimension space,
    wherein the performing of the non-linear transformation on the time-series data is performed by a first stage of a neural network that includes a residual neural network, and
    wherein the residual neural network has a plurality of layer outputs, and each layer output of the plurality is provided as the one or more nonlinear temporal embedding outputs;
  mapping the reduced dimension causality learning outputs to one or more predicted outputs, the one or more predicted outputs including a prediction of one or more of the sensor values at a second time period; and
  predicting an anomaly in a component of the piece of machinery based upon the one or more predicted outputs.

* * * * *